No. 642,555. Patented Jan. 30, 1900.
G. W. MURRAY.
POTATO DIGGING MACHINERY.
(Application filed Feb. 14, 1898. Renewed Dec. 12, 1899.)

(No Model.)

Attest:
G. A. Pennington
A. Sims

Inventor:
Geo. W. Murray
By Malcolm Ellis
Atty.

THE NORRIS PETERS CO., PHOTO-LITHO., WASHINGTON, D. C.

UNITED STATES PATENT OFFICE.

GEORGE W. MURRAY, OF SUMTER, SOUTH CAROLINA.

POTATO-DIGGING MACHINERY.

SPECIFICATION forming part of Letters Patent No. 642,555, dated January 30, 1900.

Application filed February 14, 1898. Renewed December 12, 1899. Serial No. 740,114. (No model.)

*To all whom it may concern:*

Be it known that I, GEORGE W. MURRAY, a citizen of the United States, residing at Sumter, in Sumter county, State of South Carolina, have invented a new and useful Improvement in Potato-Diggers, of which the following is a specification.

My invention relates to a machine that has for its object to open the ground, dislodging the potatoes, raising them clear from the dirt, and elevating and depositing them in a receptacle, the entire operation of the machine being automatic, together with other features of novelty, which will be more fully pointed out in the description and claims and with the drawings, which are made a part of this specification.

Figure 1:
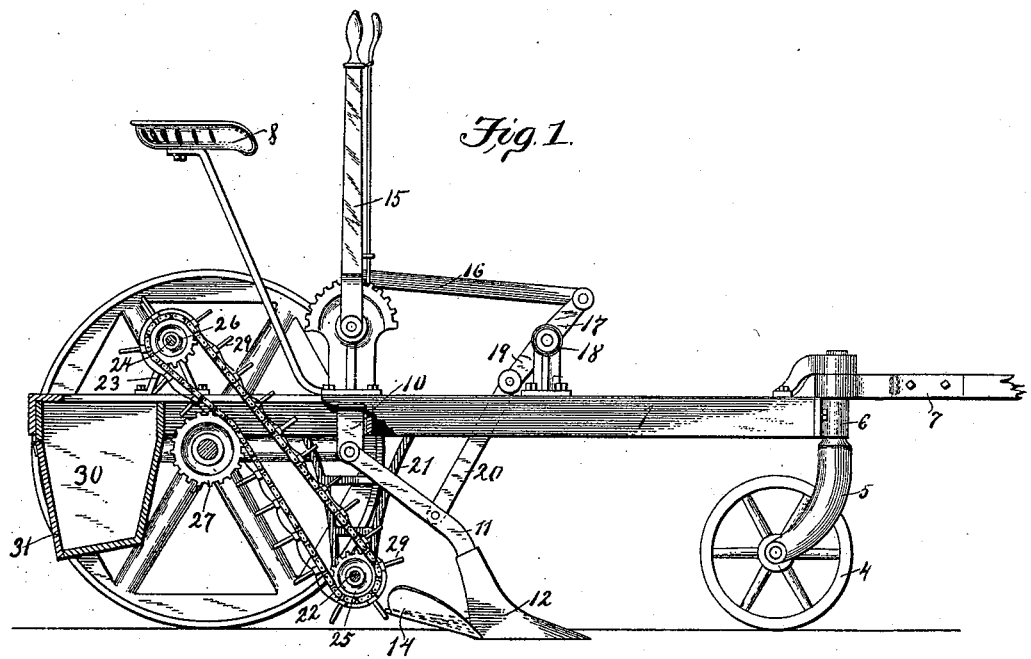
Figure 2:
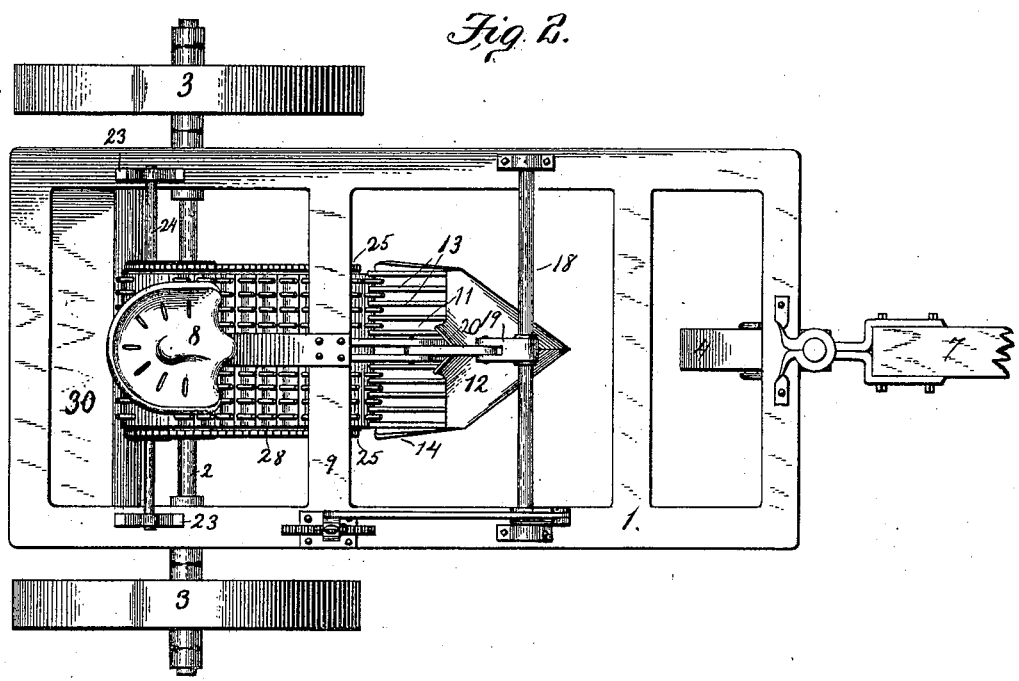

Referring to the drawings, Figure 1 is a side elevation with parts shown in section to more clearly illustrate the form of construction and operation. Fig. 2 is a top or plan view of the machine.

Referring to the drawings, 1 is the frame, which is of a rectangular pattern and is mounted upon a shaft 2, which has wheels 3, one at each extremity, the shaft 2 having journals on the under side of the frame 1. The front end of the frame is supported by a caster-wheel 4, mounted in a fork 5, which is hinged to the journals 6 at the front end of the frame 1. A tongue 7 is secured to the upper end of the fork 5 and serves for drawing and guiding the machine. Above the machine is a seat 8 of the pattern usually employed in this class of machinery. Across the frame 1 extends a bar 9, which is made integral with the frame. From the lower side of the bar 9 is a suspended journal 10, from which is hinged the plow-beam 11. This beam 11 terminates in a peculiar-shaped plowshare 12 at its lower end. This plowshare 12 is made with a point in the center and with sides of low inclination, the center of the share being raised more abruptly, so as to throw the earth to the right and left. Back of the share extend a series of prongs 13, which are in the same general plane of inclination with the lower part of the share 12, and on each side of the prongs 13 is an outwardly-inclined flange-plate 14. The prongs 13 and flange-plates 14 are rigidly secured to the plowshare 12. Above the frame 1 is mounted a hand-lever 15, provided with the usual ratchet attachment for securing the lever in any desired position. This hand-lever 15 by connecting-rod 16 operates a crank 17, mounted on a horizontal shaft 18, and from the shaft 18 there extends a crank 19, which by connecting-rod 20 couples the crank 19 with the beam 11.

By referring to Fig. 1 of the drawings it is evident that a forward movement of the hand-lever 15 will rotate the crank 17 in a forward direction and the crank 19 in a rearward and upward direction. This motion, communicated through the connecting-rod 20 to the beam 11, will raise the front end of the beam 11, thereby elevating the plowshare 12 and its connected prongs and flange-plates. On the under side of the frame 1 there are brackets 21, suspended one from each side of the machine. The lower ends of these brackets terminate in journals (not shown) for a shaft 22. On the upper side of the frame 1 there are mounted brackets 23, one on each side. These brackets serve as journals for a shaft 24. The shaft 22 carries a pair of sprocket-wheels 25, which are separated from each other a distance equal to the width that separates the flanges 14. In line with these sprocket-wheels 25 are a pair of sprocket-wheels 26, mounted upon a shaft 24, and on the shaft 2, which serves as the axis for the driving-wheels 3, a pair of sprocket-wheels 27 are secured. Around the sprocket-wheels 25 and 26 and over the sprocket-wheels 27 there passes a conveyer, which consists of slats of metal hinged together, provided with a form of link attachment at each end for meshing with the teeth of the sprocket-wheels. At each end and from the slats extend a series of projecting fingers 29. A box-shaped receptacle 30 is secured to the rear of the frame 1 and has an opening at the top, which is underneath that part of the conveyer 28 which passes around the sprocket-wheels 26. This receptacle 30 is made with an inclined bottom and hinged back 31.

The operation of this machine is as follows: The hand-lever 15 is pushed forward, which, through its connecting mechanism, raises the plowshare or shovel 12 out of the ground and clear from contact therewith. The machine is then driven to the field and brought in line with one of the rows or hills of potatoes. The hand-lever 15 is then drawn back until the plow 12 enters the ground. As the machine is drawn forward the sharp ridge down the center of the plowshare 12 serves to open the ground, and the high center part of the plowshare serves to throw the earth to each side. The inclined flange-plates 14 catch the earth as it is thrown from the plowshare 12 and deflect it back onto the prongs 13. This motion serves to agitate the earth and free the potatoes from the clods. Much of the earth will be pulverized and sift through the prongs 13 to the ground. The forward movement of the machine causes the sprocket-wheel 27 to rotate in a forward direction. This sprocket-wheel, engaging the outside of the conveyer 28, causes the under side of the conveyer to pass down and the upper side to pass up. The fingers 29 of the conveyer pass between the prongs 13 and catch the potatoes between them, carrying them up the conveyer. This motion serves to free the potatoes from what little dirt may still cling to them, the dirt sifting between the slats of the conveyer to the ground. The potatoes are carried up over the shaft 24 and fall into the receptacle 30, which is readily emptied by opening the hinged lid 31 on the back side, the potatoes rolling out from the inclined bottom. The hinged lid 31 is then closed and secured and the machine driven forward again until the receptacle 30 is filled.

The extreme simplicity of this machine, its lightness, ease of operation, and ease with which it can be repaired are among its good qualities, together with many other desirable features which can be readily seen and appreciated by those acquainted with the requirements of this kind of machine.

Having described my invention, I claim—

1. The combination in a potato-digging machine of the frame 1, of rectangular form, mounted upon wheels 3, having a cross-bar 9, between the sides of the frame 1; the beam 11 hinged from beneath the cross-beam 9, carrying the plowshare 12 at its lower end, means for raising and lowering the plowshare by swinging the beam 11 in a forward direction, the plowshare 12 having the low inclined blades and a high center part, the prongs 13 and flange-plates 14 secured to the plowshare 12, and means for drawing and guiding the machine, all substantially as described.

2. The combination in a potato-digging machine of the frame 1 of rectangular form, mounted upon wheels 3, having a cross-bar 9 between the sides of the frame 1; the beam 11 hinged from beneath the cross-beam 9, carrying the plowshare 12 at its lower end, means for raising and lowering the plowshare by swinging the beam 11 in a forward direction, the plowshare 12 having the low inclined blades and a high center part, the prongs 13 and flange-plates 14 secured to the plowshare 12, the brackets 21 supporting the lower end of the conveyer 28, and a conveyer for elevating and carrying the potatoes to a receptacle, and means for drawing and guiding the machine, all substantially as described.

3. The combination in a potato-digging machine of a frame 1, mounted upon wheels 3, a plowshare 12, having low inclined flanges terminating in a steep inclined center shank, a plow-beam 11 hinged from the frame 1 and swinging in a forward direction connected to the plowshare 12, means for raising and lowering the beam 11, through a hand-lever 15, prongs 13 back of the plowshare 12, and flanges 14 for deflecting the earth thereon, a conveyer 28 for elevating the potatoes from the prongs 13, and a receptacle 30 to receive the potatoes after being elevated.

GEO. W. MURRAY.

Witnesses:
W. McKINLAY,
A. C. BARNETT.